Patented Feb. 18, 1936

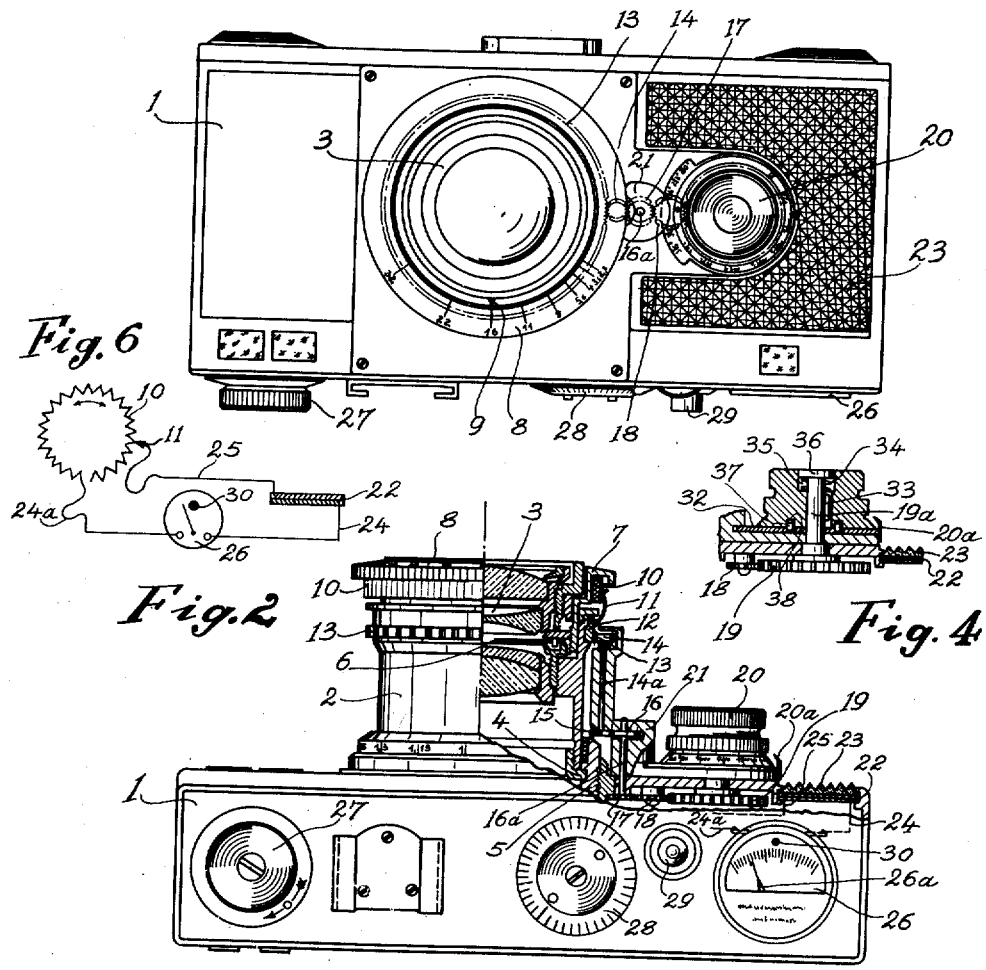

2,031,321

UNITED STATES PATENT OFFICE 2,031,321

PHOTOGRAPHIC CAMERA

Heinz Küppenbender, Dresden, Germany

Application November 15, 1934, Serial No. 753,080
In Germany December 21, 1933

17 Claims. (Cl. 95—10)

The invention relates to photographic cameras and particularly to a camera provided with a photoelectric exposure meter.

The invention has as one of its objects to provide a camera with a photoelectric exposure meter which is operatively coupled with the lens system of the camera.

It is also an object of the invention to provide a camera with an exposure meter which consists of a photocell, a resistance and a measuring instrument. If in an exposure meter of this type the photocell is exposed to the light reflected from the object to be photographed, this reflected light in photography being known as scene brightness, the electric current produced thereby in the circuit of the photocell is utilized for operating the measuring instrument.

Another object of the invention is to connect the resistance in the photocell circuit in such manner with the adjusting devices of the lens system that it is possible to correlate different lens openings and shutter adjustments to the scene brightness. For this purpose the invention contemplates the arrangement of suitable means between the resistance and the adjusting members of the lens system which upon adjustment of any adjusting member vary the resistance to cause the measuring instrument to indicate the correct setting of said adjusting members with respect to each other and with respect to the scene brightness. It is obvious from the above, that the resistance has to fit the particular lens system used with the camera.

It is therefore also an object to equip the lens system with an electric resistance of its own suitable for coaction with an exposure meter.

It is now customary, particularly in connection with the more expensive cameras, to furnish the cameras with a number of exchangeable lens systems of different focal length. The permanent attachment of the exposure meter to the camera, then presents the difficulties that any resistance is suitable for a particular lens system only.

It is now a further object of the invention to provide a camera with an exposure meter which may be used for different lens systems. This is done by locating the resistance forming a part of the exposure meter directly on the lens mounting, so that the resistance is exchanged simultaneously with the lens system. In a preferred embodiment of the invention the resistance is of annular shape and surrounds the lens mounting. With this arrangement the resistance is preferably mechanically connected with one of the two usual adjusting members, for instance with the diaphragm adjusting ring, so that the resistance rotates with the said ring. A movable contact member which connects the resistance into the photocell circuit is connected with a second adjusting device which determines the exposure time, for instance with the shutter speed adjusting lever. Owing to the movement of the contact point on the resistance, induced upon variation of the diaphragm adjustment or as upon variation of the shutter adjustment, the measuring instrument will indicate these variations and permit a correct adjustment of the diaphragm opening with respect to the shutter speed and vice versa.

In the above embodiment shown herein the resistance is mechanically connected with the diaphragm ring and moves with the latter when the lens opening is varied; in this movement the resistance slides past a contact member which is connected with the shutter adjusting lever. On the other hand, however, the contact member is moved along the resistance when the shutter adjusting lever is actuated.

Another object of the invention is to provide means for compensating these adjustments in respect of the film speed (for instance in Scheiner degrees) and also in respect of the influence of a color filter which may have been attached to the lens. This means consists of one or two couplings which are adapted to connect the resistance releasably with the exposure time adjusting devices.

It is also an object of the invention to apply the above named improvements to cameras in which the two adjusting devices, for the lens opening and the exposure time respectively, must not necessarily be attached to the lens mounting, as for instance in cameras having a curtain shutter, in which the shutter is arranged immediately in front of the film within the camera casing. The invention therefore contemplates the arrangement of mechanical coupling members between the adjusting device for the shutter speed and the resistance secured on the lens mounting, the coupling members preferably being arranged on the lens mounting. The drawing accompanying this specification shows by way of example such an embodiment of the invention.

A still further object of the invention is to provide a camera which is equipped with an exposure meter arranged on the front wall of the camera casing, directly above or adjacent the lens so that the photo-electric cell faces the object to be photographed. This arrangement of the photocell on the front wall of the camera casing permits a very compact and small construction of the camera. The measuring instrument may be arranged in the top wall of the camera casing, but it may also be arranged on the rear wall of the casing or in the field of view of the finder or distance meter.

In the attainment of the foregoing objects, together with such further objects and additional benefits and advantages as may hereinafter appear or be pointed out, the invention provides a construction and arrangement one embodiment of which is illustrated in the accompanying drawing, wherein:

Figure 1 is a front view of the camera,

Figure 2 is a bottom view of the camera shown in Figure 1 with a portion of the lens and the casing shown in section, Figure 3 shows the exchangeable lens of the camera, partly in section and showing also a modified arrangement of the resistance adapted to be inserted in the circuit of the photoelectric cell, Figure 4 shows in section a releasable coupling for the shutter adjusting device, Figure 5 is a front elevation of the shutter adjusting device, and Figure 6 shows diagrammatically the circuit of the exposure meter.

According to the drawing, the lens barrel 2 of the lens system 3 is detachably secured to the front wall of the camera casing 1 by a conventional bayonet catch 4. The focal adjustment of the lens with reference to the object to be photographed is accomplished in known manner by a worm thread 5. The lens opening is adjusted by rotating a diaphragm ring 7 which is operatively connected with an iris diaphragm 6. The diaphragm ring 7 is provided with a scale 8 cooperating with an index 9 which indicates the various lens openings. These several adjusting devices are well known and do not require any detailed description.

A resistance 10 for a photocell circuit is mounted on the circumference of the diaphragm ring 7 and is in sliding engagement with a contact member 11. This contact member 11 is secured to an annular support 12 which is rotatably mounted on the lens barrel 2. The annular support 12 is provided with gear teeth 13 which mesh with a pinion 14 on the upper end of a vertical shaft 14a. The shaft 14a is rotatably mounted in a bracket 21 which is preferably permanently secured to the camera casing 1, so as not to require removal therefrom when a lens system 3 is detached from or attached to the casing. The lower end of the vertical shaft 14a has fixed thereto a pinion 15 meshing with a pinion 16 on another vertical shaft 16a likewise rotatably mounted in said bracket 21. The lower end of said shaft 16a has fixed thereon a pinion 17 which by means of an intermediate pinion 18 is drivingly connected with a gear 19 on the lower end of a shaft 19a (Fig. 4) of the shutter adjusting device. The shutter setting device is provided with a manually rotatable button 20 adapted for adjusting the speed of the shutter.

A photoelectric cell 22 is shown to be mounted on the front face of the camera casing 1 adjacent the lens system 3 and is covered by a glass plate 23 having a prismatic surface. The prismatic surface of the glass plate is of advantage inasmuch as the field angle is thereby restricted within certain limits. A conductor 24 connects the cathode of the photoelectric cell 22 with one terminal of a measuring instrument 26, and another conductor 25 connects the other electrode of the photoelectric cell 22 with the sliding contact member 11 engaging the resistance 10 the latter being connected by a conductor 24a with the other terminal of the measuring instrument. As shown in the drawing by way of example, the measuring instrument 26 is mounted in the narrow top wall of the camera casing 1. The pointer 26a of the measuring instrument 26 is adapted to swing more or less over the dial of the instrument depending upon the strength of the electric current produced by the photoelectric cell.

The film winding knob 27 is likewise arranged on the top wall of the camera casing, which top wall is also provided with an exposure counting disk 28 and a button 29 for releasing the shutter.

In order to determine the exposure time and the corresponding diaphragm opening in accordance with the brightness of the scene and in accordance with the object to be photographed, the following procedure may be followed.

Assuming for example that a moving object is to be photographed which owing to its speed requires a short exposure time of 1/100 of a second. In order to adjust the shutter for this exposure the button 20 is rotated until the index 20a is opposite that line of the scale 20b of the button which indicates a shutter opening of 1/100 of a second. During the rotation of the button 20 the gearing 19, 18, 17, 16, 15, 14 connected therewith is actuated to rotate the annular support 12, 13 to which the contact member 11 is secured. This contact member 11 therefore slides along the resistance 10 while in frictional engagement therewith with the effect that owing to the variation of the resistance in the circuit of the photo cell the pointer of the measuring instrument is moved relatively to the dial of this instrument and after the shutter has been set may assume any position on the dial. Since the exposure time has been selected it is now necessary to find the correct lens opening for this exposure time under the prevailing light conditions. This is accomplished by first pointing the lens and therewith the photoelectric cell at the object or scene to be photographed, so that the light reflected from the object or scene can influence the photoelectric cell and then rotating the diaphragm ring 7. Since the resistance 10 is fixedly attached to this ring 7 the resistance is now rotated relatively to the contact member 11 which during this operation remains stationary. The diaphragm ring 7 is rotated until, owing to the varying resistance in the photo-cell circuit, the pointer 26a of the measuring instrument 26 points to a certain indicating mark 30 on the dial. When this pointer 26a is in this position the diaphragm 6 has been adjusted automatically to its correct size with respect to the selected exposure time under the prevailing light conditions of the object to be photographed. The adjustment may also be accomplished in reverse manner by first selecting the diaphragm opening in accordance with the desired depth of contrast and then while pointing the lens at the object to be photographed rotating the button 20 until the pointer 26a points to the mark 30, indicating in this manner that now the shutter has been set for the correct exposure time.

In the lens system shown in Figure 2 the resistance 10 has the shape of ring whose axial length is greater than its radial thickness, while in Figure 3 the resistance 10a has the shape of an annular disc. In both cases the sliding contact member 11 or 11a respectively is formed in such manner that it engages the larger surface of the resistance.

Figure 4 shows in detail an example of a releasable coupling which may be arranged between the shutter adjusting button 20 and an indicating member 32 which registers the setting of the shutter and which therefore also cooperates with the contact member 11 for the resistance. This coupling is arranged for the purpose of adjusting the exposure meter for various film speeds or in other words for films of different light sensitiveness. According to Figure 4 the button 20 is slidably connected to the shaft 19a by a key and slot connection 33 and normally is urged downwardly in engagement with the indicating member 32 by a spring 34. This spring 34 encircles the shaft 19 and is confined in a recess 35 in the upper end of the button 20 between the bottom of the recess and a head 36 on the shaft 19a. The indicating member 32 is provided with a pair of upwardly extending projections 37 adapted to enter selectively in a plurality of pairs of recesses 38 in the bottom surface of the button 20. The indicating member 32 is provided with a scale 32a designating various film speeds, while the button 20 is provided with an index 31 cooperating with said scale 32a. In order to correlate the exposure meter with a certain film speed the button 20 is lifted against the action of the spring 34 until the button is disengaged from the projections 37 and then the button 20 is rotated until its index 31 points to the desired film speed on the scale 32a. The button 20 is then released and is moved by the spring 34 downwardly whereby the projections 37 enter into another pair of recesses 38. In this manner the contact member 11 will be moved relatively to the resistance to a position which embodies a suitable consideration of the film speed or sensitiveness of the emulsion on the film. After this preliminary adjustment has been made the exposure measurement takes place as already described.

Having thus described my invention and illustrated its use, what I claim as new and desire to secure by Letters Patent is:

1. The combination of a photographic camera with a photoelectric exposure meter, including an exchangeable lens system, means for adjusting the opening of said lens system, a shutter, means for adjusting the speed of said shutter, a photoelectric cell, a circuit therefor, a resistance on said exchangeable lens system, and means for connecting said resistance in said circuit, said adjusting means for the lens opening and shutter speed respectively being adapted to effect a variation of said resistance, whereby the reading of said photoelectric exposure meter is changed.

2. The combination of a photographic camera with a photoelectric exposure meter, including a lens system, means for adjusting the opening of said lens system, a shutter, means for adjusting the speed of said shutter, a photoelectric cell, a circuit therefor, and a resistance in said circuit, said adjusting means when actuated to vary the lens opening or shutter speed respectively being adapted to effect a variation of said resistance whereby the reading of said photoelectric exposure meter is changed, and means on said exposure meter for indicating the correct setting of said two adjusting means with respect to each other.

3. The combination of a photographic camera with a photoelectric exposure meter, including a lens system, means for adjusting the opening of said lens system, a shutter, means for adjusting the speed of said shutter, and means correlating both of said adjusting means with said photoelectric exposure meter, said correlating means being adapted to control the reading of said exposure meter when either of said adjusting means are actuated, the said correlating means upon setting of one of said adjusting means being adapted to control the final adjustment of the other adjusting means to set up a predetermined reading in the exposure meter by both of said adjustments.

4. The combination of a photographic camera with a photoelectric exposure meter, including an exchangeable lens system, a mounting for the same adapted to permit said lens system to be removed and attached as a unit, means for adjusting the opening of said lens system, a shutter, means for adjusting the speed of said shutter, a photoelectric cell, a circuit therefor, and a resistance in said circuit variable automatically upon adjustment of said lens opening, said resistance being also varied automatically when the shutter speed is adjusted, said resistance being arranged on the mounting of said exchangeable lens system and being exchanged with the latter.

5. The combination of a photographic camera with a photoelectric exposure meter, including an exchangeable lens system, a mounting for the same means for adjusting the opening of said lens system, a shutter, means for adjusting the speed of said shutter, a photoelectric cell, a circuit therefor, and a resistance in said circuit variable automatically upon adjustment of said lens opening, said resistance being also automatically varied when the shutter speed is adjusted, said resistance having the shape of an annular member which surrounds the mounting of the lens system and is attached thereto.

6. In a photographic camera, the combination of a lens system with an adjustable diaphragm, a manually rotatable diaphragm ring operatively connected with said diaphragm for adjusting the same, a shutter, means for adjusting the speed of said shutter, an electric circuit including a photoelectric cell, a resistance and a measuring instrument, said resistance being mounted on said diaphragm ring to rotate therewith, and a contact member in said circuit in sliding engagement with said resistance, said contact member being movable along said resistance by said shutter speed adjusting means when the latter is actuated to adjust the shutter speed.

7. In a photographic camera, the combination of a lens system with an adjustable diaphragm, a manually rotatable diaphragm ring operatively connected with said diaphragm for adjusting the same, a shutter, a lever for adjusting the speed of said shutter, an electric circuit including a photoelectric cell, a resistance and a measuring instrument, said resistance being mounted on said diaphragm ring to rotate therewith, and a contact member in said circuit in sliding engagement with said resistance, said contact member being connected with said shutter speed adjusting lever and being movable along said resistance when said lever is actuated to vary the shutter speed.

8. In a photographic camera, the combination of a lens system with an adjustable diaphragm, a manually rotatable diaphragm ring operatively connected with said diaphragm for adjusting the same, a shutter, means for adjusting the speed of said shutter, an electric circuit including a photoelectric cell, a resistance and a measuring instrument, said resistance being mounted on said diaphragm ring to rotate therewith, a contact member in said circuit in sliding engagement with said resistance, said contact member being movable along said resistance by said shutter speed adjusting means when the latter is actuated to adjust the shutter speed, and a releasable connection between said contact member and said shutter speed adjusting means.

9. In a photographic camera, the combination of a lens system with an adjustable diaphragm, a manually rotatable diaphragm ring operatively connected with said diaphragm for adjusting the same, a shutter, means for adjusting the speed of said shutter, an electric circuit including a photoelectric cell, a resistance and a measuring instrument, said resistance being mounted on said diaphragm ring to rotate therewith, a contact member in said circuit in sliding engagement with said resistance, said contact member being movable along said resistance by said shutter speed adjusting means when the latter is actuated to adjust the shutter speed, a releasable connection between said contact member and said shutter speed adjusting means, and means for adjusting said shutter speed adjusting means for different film speeds.

10. A lens system for a photographic camera, including a mounting, means for detachably securing the same to a camera, an annularly shaped electrical resistance secured on the outer circumference of said mounting, and a contact member in sliding engagement with said resistance and supported by said mounting.

11. A lens system for a photographic camera, including a mounting, means for detachably securing the same to a camera, an adjustable diaphragm, a manually rotatable ring operatively connected with said diaphragm for varying the same, an electrical resistance of annular shape secured to said ring to rotate therewith, and a contact member in sliding and conductive engagement with said resistance.

12. A lens system for a photographic camera, including a mounting, means for detachably securing the same to a camera, an adjustable diaphragm, a manually rotatable ring operatively connected with said diaphragm for varying the same, an electrical resistance of annular shape secured to said ring to rotate therewith, and a contact member in sliding and conductive engagement with said resistance, said contact member being secured to another ring which is rotatably mounted on said mounting independent of said first named rotatable ring.

13. The combination with a photographic camera having a lens system provided with a variable diaphragm, means for adjusting the opening of said diaphragm, a shutter, and means for adjusting the speed of said shutter; of a photoelectric exposure meter adapted to be influenced by an electrical resistance which is varied by said diaphragm adjusting means and also by said shutter speed adjusting means, said resistance being arranged on said lens system.

14. The combination with a photographic camera having a lens system provided with a variable diaphragm, means for adjusting the opening of said diaphragm, a shutter, and means for adjusting the speed of said shutter; to a photoelectric exposure meter adapted to be influenced by an electrical resistance which is varied by said diaphragm adjusting means and also by said shutter speed adjusting means, said resistance having the shape of an annular member surrounding said lens system and supported by the same.

15. The combination with a photographic camera having a lens system provided with a variable diaphragm, means for adjusting the opening of said diaphragm, a shutter, and means for adjusting the speed of said shutter; of a photoelectric exposure meter adapted to be influenced by an electric resistance which is varied by said diaphragm adjusting means and also by said shutter speed adjusting means, said resistance being arranged on said lens system and being connected with an annular member forming a part of said diaphragm adjusting means.

16. The combination with a photographic camera having a lens system provided with a variable diaphragm, means for adjusting the opening of said diaphragm, a shutter, and means for adjusting the speed of said shutter; of a photoelectric exposure meter adapted to be influenced by an electrical resistance which is varied by said diaphragm adjusting means and also by said shutter speed adjusting means, said resistance being arranged on said lens system, and a slidable contact member engaging said resistance, said contact member being connected with an adjusting lever forming a part of said shutter adjusting means.

17. The combination with a photographic camera having a lens system provided with a variable diaphragm, means for adjusting the opening of said diaphragm, a shutter, and means for adjusting the speed of said shutter; of a photoelectric exposure meter adapted to be influenced by an electrical resistance which is varied by said diaphragm adjusting means and also by said shutter speed adjusting means, and a releasable connection between said resistance and said shutter speed adjusting means.

HEINZ KÜPPENBENDER.